April 15, 1952  J. S. GOODELL  2,593,021
TRACTOR CULTIVATOR
Filed Sept. 30, 1949  3 Sheets-Sheet 1

INVENTOR.
John S. Goodell,
BY

April 15, 1952 — J. S. GOODELL — 2,593,021
TRACTOR CULTIVATOR
Filed Sept. 30, 1949 — 3 Sheets-Sheet 2
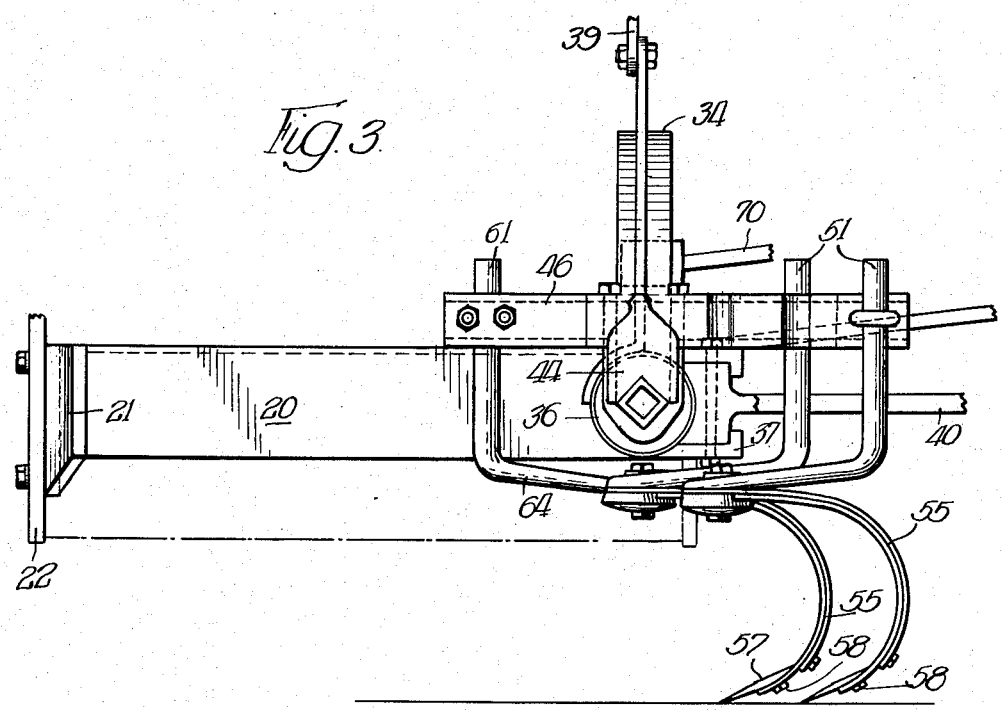
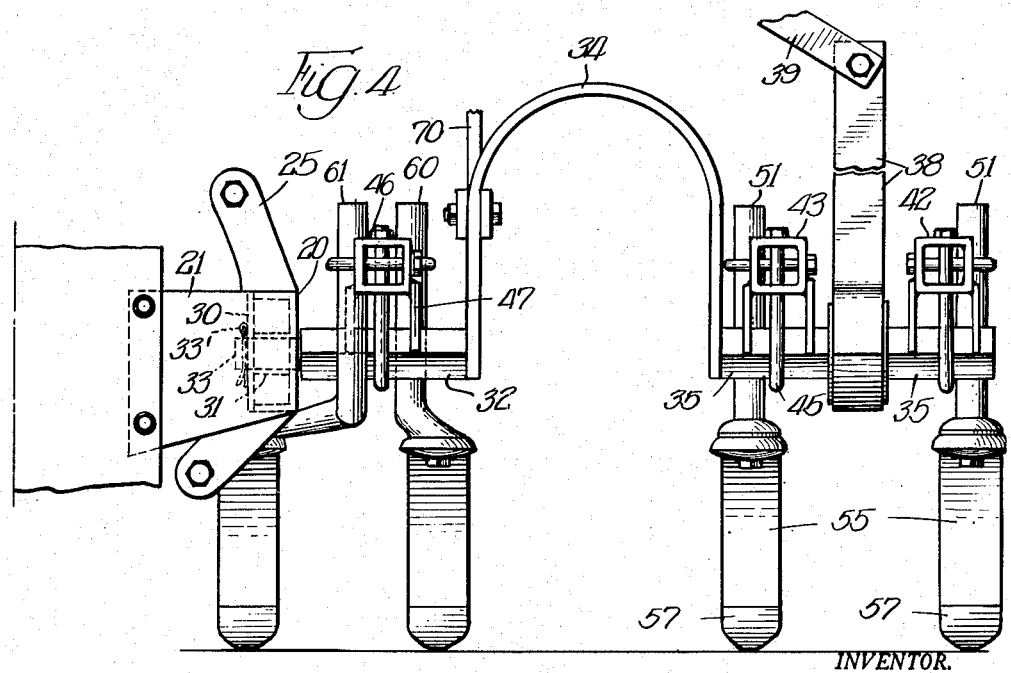
INVENTOR.
John S. Goodell, April 15, 1952  J. S. GOODELL  2,593,021
TRACTOR CULTIVATOR Filed Sept. 30, 1949  3 Sheets-Sheet 3

INVENTOR.
John S. Goodell,
BY

Patented Apr. 15, 1952

2,593,021

UNITED STATES PATENT OFFICE 2,593,021

TRACTOR CULTIVATOR

John S. Goodell, Darlington, Wis.

Application September 30, 1949, Serial No. 118,853

6 Claims. (Cl. 97—47)

This invention relates to tractor-mounted cultivators and has for its principal object the provision of a new and improved cultivator of this kind.

It is a main object of the invention to provide a cultivator that can be mounted between the front and rear axles of a tractor in which the crankcase, transmission housing, and differential housing form a rigid connecting framework connecting the front and rear axles.

Another object of the invention is to provide a cultivator mounted between the front and rear axles of a tractor and having no connection whatever with the front axle of the tractor.

Another object of the invention is to provide a cultivator adapted to be mounted upon a tractor having a power lift and to employ that power lift to elevate the shovels of the cultivator out of working position.

Another object of the invention is to provide a cultivator which is light in weight but has sufficient strength to withstand the hard usage to which it will be put.

Still another object of the invention is to provide a cultivator for mounting upon a tractor, which can be manufactured at low cost without sacrificing quality.

Still another object of the invention is to provide a cultivator which can be mounted upon and removed from a tractor with a minimum of effort.

Further objects of the invention not specifically mentioned here will be apparent from the detailed description and claims which follow, reference being had to the accompanying drawings in which a preferred embodiment of the invention is shown by way of example and in which Fig. 1 is a plan view of a tractor showing the cultivator attached thereto;

Fig. 3 is a side elevational view of the cutlivator;

Fig. 4 is a front elevational view of the cultivator; and

Figure 1:
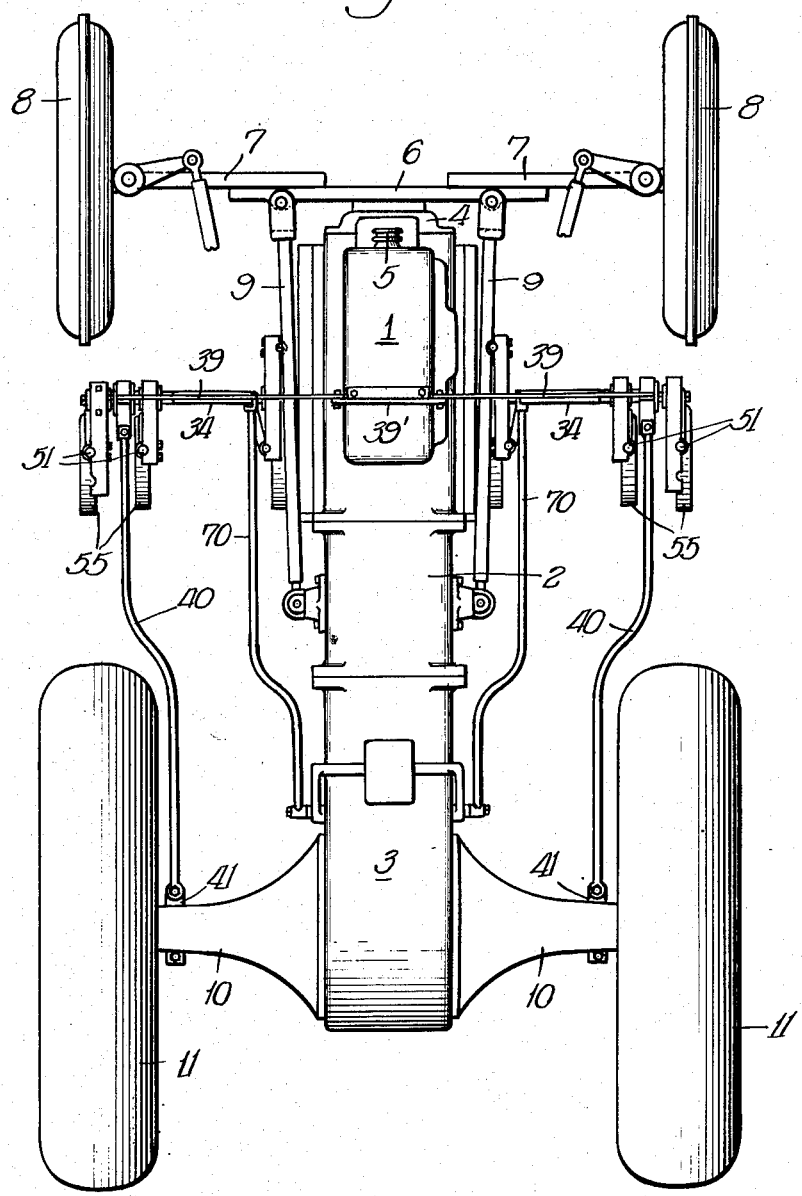

Farm tractors are now commonly employed in plowing, planting and cultivating certain farm crops, including corn. In certain instances these tractors contain frames to which implements, such as planters and cultivators, can be attached to position them between the front and rear axles of the tractor, in which position the driver of the tractor can best observe the functioning of the implement. In other instances the tractors contain no frames but rather the crankcase and oil pan of the engine; the housing of the transmission and housing of the differential form the only framelike connection between the front and rear axles of the tractor. In such instances implements such as cultivators have generally been connected rearwardly of the rear axle of the vehicle, in which position it is difficult for the driver since he must look rearwardly to observe the functioning of the implement and forwardly to guide the tractor.

In the prior art of which I am aware, efforts have been made to mount the cultivators on such frameless tractors usually by supporting the implement on the front axle of the vehicle or upon an implement framework that is fixed upon the forward end of the vehicle in juxtaposition to the front axle. Such an arrangement, while it may position the cultivator where the driver can better observe its operation without serious distraction from driving the tractor, nevertheless has many disadvantages. It is to the solution of this problem that the present invention particularly relates.

Certain frameless tractors, specifically Ford and Ferguson tractors, attach the front axle to the front end of the crankcase or oil pan of the vehicle by a bracket which serves also as a protective guard for the fan belt pulley of the engine. The rear end of the crankcase and oil pan are secured to the front end of the transmission housing by bolts or studs projecting through flanges on those members.

In its preferred form, the present invention includes a base plate extending alongside each side of the crankcase and secured thereto by brackets through which are extended the bolts or studs by which the front end of the crankcase is connected to the front axle bracket and the rear end of the crankcase is connected to the transmission housing.

Projecting laterally from these base plates are cultivator supporting rods that are disposed approximately on the transverse median line on the tractor so that the cutlivator shovels carried thereby are located well ahead of the driver, in which position he may observe their operation with a minimum of distraction of his attention from driving the tractor. The outward end of the support bars are braced by upwardly extending brace rods that are attached to the engine and thrust upon the support bars is resisted by thrust bars extending rearwardly to and fixed upon the rear axle housing.

Although the cultivator attachment is designed for attachment on frameless tractors, its use is not limited to such tractors. Certain other tractors have frames which do not lend themselves readily to supporting cultivators forwardly of the rear wheels of the tractor, in which cases the implement of the present invention may be used advantageously, and such use is contemplated within the teachings of the invention.

Referring now to the drawings in more detail, in Fig. 1 a typical frameless tractor is illustrated somewhat diagrammatically. The tractor consists of an engine 1, a transmission housing 2, and a differential housing 3, fixed together by suitable bolts or studs extending through flanges in the units to form the frame of the vehicle. Fixed to the front end of the engine is a bracket 4 that extends around the fan belt pulley 5 and supports the rigid front axle 6 upon the engine. Adjustable front axle 7 is secured to the rigid axle 6 to support the front end of the vehicle on the front wheels 8. Thrust bars 9 secured to the axle 6 and extending alongside of the engine are secured at their rear ends to the transmission housing 2 to brace the front axle. Rear axle housings 10 extend laterally from the differential housing 3 and support the rear end of the tractor upon the rear driving wheels 11.

Figure 2:
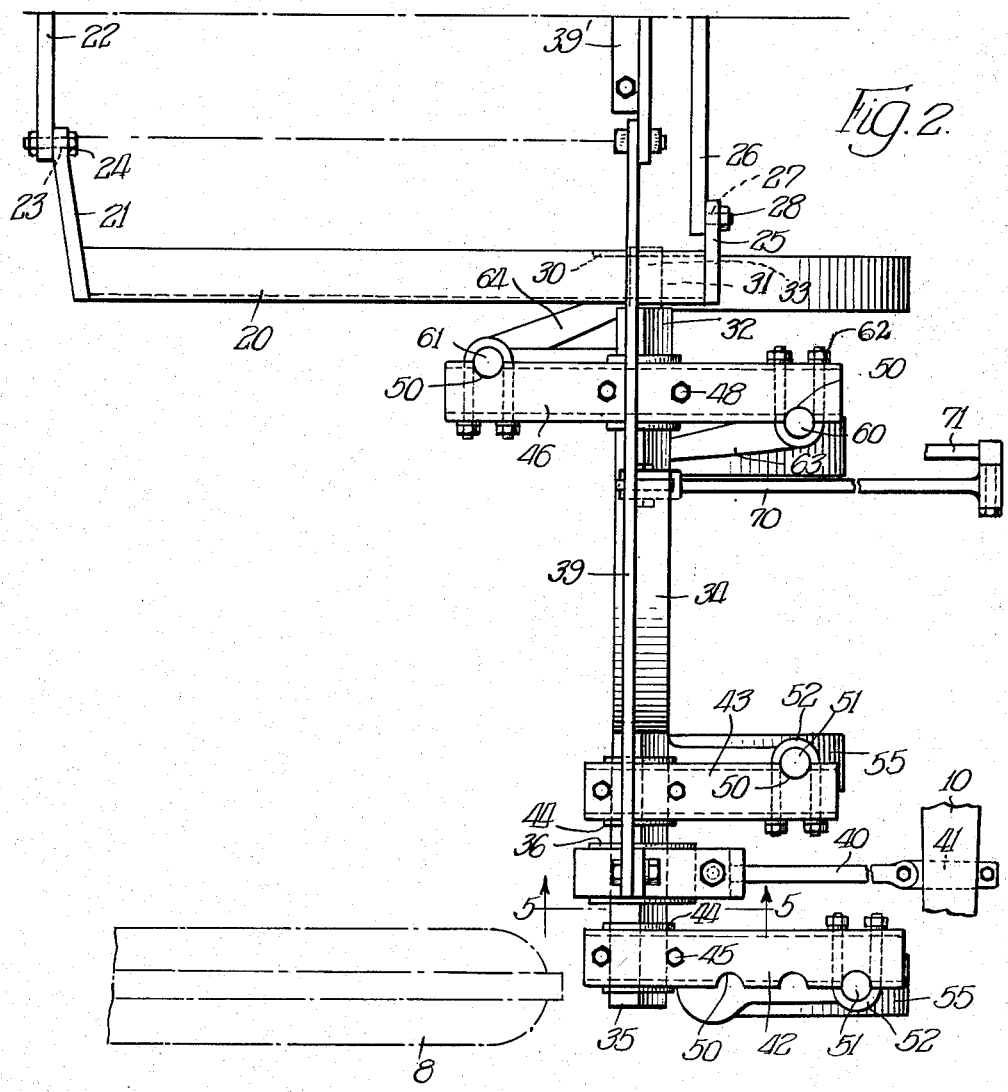
Fig. 2 is a plan view of the cultivator drawn to an enlarged scale.

As will be seen in Figs. 2, 3 and 4, the cultivator consists of a base plate 20, preferably a channel, at the forward end of which is a bracket 21 that registers with the flange 22 on the front end of the engine, this bracket containing bolt holes 23 which register with the bolt holes in the flange through which the bolts 24 secure the front axle bracket 4 to the engine. These bolts serve also to secure the bracket 21 to the engine. At the rear end of the base plate 20 is a second bracket 25 shaped to register with the flange 26 on the rear end of the engine and having bolt holes 27 that register with the bolt holes in that flange so that studs 28 which secure the engine to the transmission housing serve also to support the bracket 25.

Fitted in the open side of the channel 20 near the rear end thereof is a stub plate 30 which, with the web of the channel, supports a bushing 31 around perforations in the web and plate 30. The rotatable cultivator support bars 32 contain a shank 33 which projects through the perforations in the web and plate 30 and engage the bushing 31 to rotatably support the rod on the plate. Shank 33 is secured in the bushing 31 in any preferred manner, such as by a cotter pin 33'. Preferably bar 32 is of hollow rectangular configuration.

The outward end of bar 32 is fixed to a generally U-shaped member 34 and a continuation 35 of bar 32 is fixed to the other end of this member 34 in axial alignment with the bar 32. The U-shaped member 34 being inverted forms an arch through which the stalks in the corn row can pass, thereby giving such stalks higher vertical clearance than would otherwise be possible.

Figure 5:
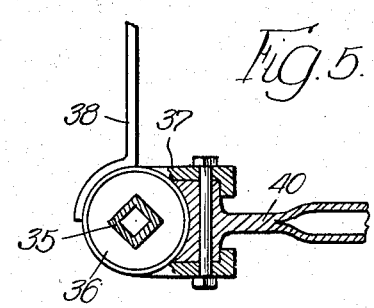
Fig. 5 is a fragmentary cross sectional view taken substantially along the line 5—5 of Fig. 2, looking in the direction of the arrows.

Located upon the section 35 of the support bar 32, near the outer end thereof, is a cylindrical bushing 36, Fig. 5, that is engaged by the clevis-like clamp 37, to which clamp an upwardly extending brace bar 38 is fixed. Extending upwardly from the upper end of this bar 38 and inwardly toward the tractor is a brace bar 39 which extends upwardly and inwardly to the top of the motor 1. As will be seen in Fig. 1, an angle bar 39' extends across the top of the engine and is secured thereto by two of the cylinder head bolts. Brace bars 39 on the two sides of the engine are secured to this angle bar by bolts or otherwise. Through this arrangement thrusts placed on the angle bar 39' by one of the brace bars 39 is transmitted in part to the other brace bar and the strain on the motor 1 is minimized.

Fixed to the clevis-like bracket 37 and extending rearwardly therefrom is a tubular thrust bar 40, the rear end of which is secured to a plate 41 that is fixed to the rear axle housing 10 in any convenient manner such as by the bolts (not shown) which secure the fenders (not shown) thereto. Preferably thrust bars 40 are curved as shown in Fig. 1 to clear the driving wheels 11 and to lie alongside of the corn row passing under arch 34. Plates 41 ordinarily will remain on the tractor permanently, even though the cultivator attachment is removed to permit using the tractor for other purposes. The thrust bar 40 and brace bars 38 and 39 together rigidly support the outward end of the support bar 32 and take up the thrust placed thereon by the operation of the cultivator shovels.

Mounted upon the bar 32 are stocks 42 and 43, each of which is preferably of hollow rectangular section and to which V-blocks 44 are fixed and registered with the square section bar 32 to securely seat the stocks thereon. The stocks are secured in place by U-bolts 45 which encircle the bar 32. Stocks 42 and 43, disposed upon opposite sides of the thrust bar 40 and on the section 35 of the support bar 32, are disposed outwardly of the arch 34 and hence capable of supporting cultivator shovels that cultivate the outer side of the corn row registered with that arch.

Located on the support bar 32 and between the arch 34 and base plate 20 is another stock 46 similar to stocks 42 and 43 but extending both forwardly and rearwardly of the bar 32. Stock 46 is also equipped with V-plates 47 which seat it firmly upon the bar 32 to which it is secured by a U-bolt 48.

Stocks 42, 43 and 46 each contain notches 50 by which L-shaped cultivator support bars 51 are registered with the stock and secured thereto by U-bolts 52.

As will be seen best in Figs. 3 and 4, the L-shaped support bar 51 secured to the stock 42 extends forwardly and can be rotated about a substantially vertical axis thereby to variably position the free end of the bar laterally of the tractor. Bar 51 may also be adjusted vertically with respect to the stock 42, so as to vary the depth to which the cultivator shovel will project into the ground, as will presently appear. Secured to the free end of this bar 51 is a generally J-shaped shovel supporting member 55, preferably somewhat resilient and composed of several leaves that are secured together by a bolt. It will be apparent that the member 55 is capable of being rotated around the bolt by which it is attached to the bar 51 and that greater flexibility in the lateral adjustment of the cultivator shovel is thereby secured. A cultivator shovel 57 of any preferred shape is secured to the free end of the member 55 by bolt 58 in the usual manner.

The stock 42 is preferably longer than the stock 43 and each contains a plurality of notches 50 so that when an L-shaped cultivator support bar 51 is registered with the stock 43 the cultivator shovel adjacent the corn row can be placed slightly ahead of the shovel supported by stock 42 if desired. The bars 51 in stocks 42 and 43 will ordinarily be adjusted vertically so that the shovels will all penetrate to the same depth when lowered to operating position.

L-shaped support bars 60 and 61, similar to the bars 51, are registered with the stock 46 and secured thereto by U-bolts 62. Bar 60 extends forwardly of its vertical section, as indicated at 63, and bar 61 extends rearwardly thereof, as indicated at 64, so that cultivator shovels supported upon these bars in the manner hereinbefore explained in connection with bar 51 will be positioned laterally in alignment with the shovels supported on stocks 42 and 43.

Pivotally secured to the innermost side of the arch 34 is a power lift rod 70, the rear end of which is connected to the power lift crank arm 71 that projects outwardly from the differential housing of the tractor. Thus when this lift arm 71 is rotated to move arch 34 forwardly, stocks 42, 43 and 46 will be rotated around the axis of rod 32 and the shovels 57 will be elevated and thus brought out of the ground so that the tractor can be moved without cultivating.

The cultivator structure shown in the drawings is duplicated, with rights and lefts, on the other side of the tractor. Since the structures are mechanically the same and function in the same manner, detailed description thereof herein is not deemed necessary.

With the two cultivator units thus mounted on the tractor, the engine, transmission and differential are aligned midway between adjacent corn rows. The wheels are set so that they run on the outside of those rows; and as the tractor moves along the rows, the two rows are cultivated completely in a single operation. By proper lateral adjustment of the shovels, thorough working of the ground between the rows can be achieved.

The cultivators thus described are sufficiently light that one man can attach them to the tractor in a few minutes time. Although light, they are strong and rugged and capable of withstanding the rough usage to which implements of this type are frequently subjected. The cultivators provide a relatively inexpensive implement that is located on the tractor so as to permit supervision of the operation of the implement without distracting the driver's attention from the steering of the vehicle.

While I have chosen to illustrate my invention by showing and describing a preferred embodiment of it, I have done so by way of example only, as there are many modifications and adaptations which can be made by one skilled in the art within the teachings of the invention.

Having thus complied with the statutes as shown and described a preferred embodiment of the invention, what I consider new and desire to have protected by Letters Patent is pointed out in the appended claims.

What is claimed is:

1. A cultivator for mounting upon a tractor in which the engine crankcase, transmission housing and differential housing form the only frame between the front and rear axles and in which the front axle is mounted by a bracket engaging the front end of the crankcase and the rear axles are encased in housings projecting laterally from the differential housing and in which power lift crank arms project from the transmission housing, comprising base plates disposed alongside the crankcase and secured thereto; rotatable support bars carried by and extending laterally from said base plates; an inverted U-section included in each rotatable support bar and adapted to arch over a row of corn that is being cultivated; tool supporting stocks secured to said support bars; vertical brace bars engaging said support bars adjacent their outer ends and extending upwardly and towards the engine to which they are secured; thrust bars engaging said support bars and brace bars and extending rearwardly therefrom to the rear axle housing to which they are secured; and earth working tools fixed upon said tool supporting stocks.

2. A cultivator as claimed in claim 1, in which a base plate and support bar are disposed on each side of the engine crankcase.

3. A cultivator as claimed in claim 1, in which the tool supporting stocks are disposed on opposite sides of the U-shaped section on the rotatable support bars.

4. A cultivator as claimed in claim 1, in which the earth working tools are positioned with respect to the rotatable support rods, which contain the inverted U-shaped sections, so that as those rods are rotated to move the closed end of the U-section forwardly of the tractor the tools will be raised.

5. A cultivator as claimed in claim 1, in which the rotatable support rods are rotated by a link extending from inverted U-shaped sections of the rods to the power lift crank arms of the tractor.

6. A cultivator attachment for mounting upon a tractor provided with an engine crankcase, transmission housing and rear axle housing, comprising: base plates secured alongside the crankcase; rotatable support bars carried by and extending laterally from said base plates; inverted archlike sections included in said support bars and adapted to arch over corn rows disposed on either side of the engine; tool support stocks secured to said support bars on opposite sides of said archlike sections; vertical brace bars secured at one end adjacent the outer end of the rotatable support bars and at the other end to the engine; thrust bars engaging said rotatable support bars and extending rearwardly therefrom and secured to the rear axle housing; and earth working tools fixed upon said tool supporting stocks.

JOHN S. GOODELL.

REFERENCES CITED

The following references are of record in the file of this patent:

UNITED STATES PATENTS

| Number | Name | Date |
| --- | --- | --- |
| 1,699,121 | Reynolds | Jan. 15, 1929 |
| 1,890,450 | Altgelt | Dec. 13, 1932 |
| 1,899,940 | Cady | Mar. 7, 1933 |
| 2,171,830 | Hayes | Sept. 5, 1939 |
| 2,239,332 | Mee | Apr. 22, 1941 |
| 2,247,367 | Frudden et al. | July 1, 1941 |

FOREIGN PATENTS

| Number | Country | Date |
| --- | --- | --- |
| 549,114 | Great Britain | Nov. 6, 1942 |